(12) United States Patent
Galloway et al.

(10) Patent No.: US 8,343,661 B2
(45) Date of Patent: Jan. 1, 2013

(54) CATHODE COMPOSITIONS COMPRISING ZN AND CHALCOGENIDE AND ENERGY STORAGE CELL COMPRISING SAME

(75) Inventors: Roy Christie Galloway, Derby (GB); Richard Louis Hart, Broadalbin, NY (US); Charles Dominic Iacovangelo, Saratoga Springs, NY (US); Grigorii Lev Soloveichik, Lantham, NY (US)

(73) Assignee: General Electric Company, Schenectady, NY (US)

( * ) Notice: Subject to any disclaimer, the term of this patent is extended or adjusted under 35 U.S.C. 154(b) by 512 days.

(21) Appl. No.: 12/611,993

(22) Filed: Nov. 4, 2009

(65) Prior Publication Data

US 2011/0104570 A1 May 5, 2011

(51) Int. Cl.
*H01M 4/13* (2010.01)

(52) U.S. Cl. .................. 429/229; 429/231.1; 429/231.5; 429/323

(58) Field of Classification Search ........................ None
See application file for complete search history.

(56) References Cited

U.S. PATENT DOCUMENTS

| | | | |
|---|---|---|---|
| 4,288,506 A | 9/1981 | Coetzer et al. | |
| 4,452,777 A | 6/1984 | Abraham et al. | |
| 4,529,676 A | 7/1985 | Galloway et al. | |
| 4,592,969 A | 6/1986 | Coetzer et al. | |
| 4,626,483 A | 12/1986 | Bones et al. | |
| 4,797,333 A | 1/1989 | Coetzer et al. | |
| 4,975,343 A | 12/1990 | Coetzer | |
| 5,283,135 A | 2/1994 | Redey et al. | |
| 5,340,668 A | 8/1994 | Redey et al. | |
| 5,403,676 A | 4/1995 | Coetzer et al. | |
| 5,476,733 A | 12/1995 | Coetzer et al. | |
| 5,536,593 A | 7/1996 | Redey et al. | |
| 5,573,873 A | 11/1996 | Bugga et al. | |
| 5,604,053 A | 2/1997 | Coetzer et al. | |
| 5,972,533 A | 10/1999 | Coetzer et al. | |
| 6,207,324 B1 | 3/2001 | Licht | |
| 2008/0145755 A1* | 6/2008 | Iacovangelo et al. | 429/188 |
| 2009/0162736 A1 | 6/2009 | Vallance et al. | |
| 2009/0233170 A1 | 9/2009 | Iacovangelo et al. | |

OTHER PUBLICATIONS

WO Search Report issued in connection with corresponding WO Patent Application No. US10/48750 filed on Sep. 14, 2010.
Bones, R. J.; Teagle, D. A.; Brooker, S. D.; Cullen, F. L, Development of a nickel/nickel dichloride positive electrode for a liquid sodium (ZEBRA) battery cell. Journal of the Electrochemical Society 1989, 136, (5), 1274-7.
Ratnakumar, B. V.; Surampudi, S.; Halpert, G., Effects of sulfur additive on the performance of Na/NiCl2 cells. J. Power Sources 1994, 48, (3), 349-360. Prakash, J.; Redey, L.; Vissers, D., Effect of chemical additives on the performance of Na/NiCl2 cells. Ionics 2000, 6, (3), 210-217.
Prakash, J. Redey, L.; Vissers, D. R.; DeGruson, J., Effect of sodium iodide additive on the electrochemical performance of sodium/nickel chloride cells. Journal of Applied Electrochemistry 2000, 30, (11), 1229-1233.
Prakash, J.; Redey, L.; Vissers, D. R., Electrochemical Behavior of Nonporous Ni/NiCl[sub 2] Electrodes in Chloroaluminate Melts. Journal of the Electrochemical Society 2000, 147, (2), 502-507.

* cited by examiner

*Primary Examiner* — Yelena G Gakh
(74) *Attorney, Agent, or Firm* — GE Global Patent Operation; Peter T. DiMauro

(57) ABSTRACT

A cathode composition and a rechargeable electrochemical cell comprising same are disclosed. The cathode composition is described as comprising (i) particles including a transition metal selected from the group consisting of Ni, Fe, Cr, Mn, Co, V, and combinations thereof; (ii) alkali halometallate; (iii) alkali halide; (iv) source of Zn; and (v) source of chalcogenide. Also described is a rechargeable electrochemical cell comprising the composition. The source of Zn and source of chalcogenide in the cathode composition of a cell may be effective to improve the extractable capacity of cells, and decrease the cell resistance, relative to their absence.

23 Claims, 6 Drawing Sheets

CATHODE COMPOSITIONS COMPRISING ZN AND CHALCOGENIDE AND ENERGY STORAGE CELL COMPRISING SAME

BACKGROUND

1. Field of Use

The invention includes embodiments that relate to a cathode composition with one or more additive for use in an electrochemical cell, and an energy storage device including the same.

2. Discussion of Art

Electrochemical cells are known which include a molten alkali metal (such as sodium) negative electrode or anode; an electrically insulative solid separator which functions as an alkali metal ion-conducting solid electrolyte; a salt electrolyte in the positive electrode compartment which is at least partially molten at the operating temperature of the cell; and a positive electrode. These have been referred to as sodium-metal halide cells or batteries. Electrochemical cells of this type are useful as power sources or energy storage devices.

For mobile applications such as hybrid locomotives or plug-in electric vehicles (PHEV), it is desirable for a sodium-metal halide battery to be able to tolerate power surges (i.e., high currents) during both battery charging and discharging, without significant loss in the working capacity and the cycle life. In particular, for mobile applications attempting to provide better fuel economy via regenerative braking, this betterment in electric efficient is desirable. One known way to attempt improvements in cell performance of sodium-metal halide cells, is by addition of a small amount of elemental sulfur to the cathode composition.

However, there continues to remain a need for new additives to solve the problems of high current cell performance, to improve the cell working capacity and decrease the capacity degradation rate.

BRIEF SUMMARY

One embodiment of the present invention is directed to a cathode composition comprising, (i) particles comprising a transition metal selected from the group consisting of Ni, Fe, Cr, Mn, Co, V, and combinations thereof; (ii) alkali halometallate; (iii) alkali halide; (iv) one or more source of Zn; and (v) one or more source of chalcogenide.

Another embodiment of the present invention is directed to a rechargeable energy storage cell comprising, (a) a first compartment comprising metallic alkali metal; (b) a second compartment comprising a cathode composition, the cathode composition including: (i) particles comprising a transition metal selected from the group consisting of Ni, Fe, Cr, Mn, Co, V, and combinations thereof; (ii) alkali halometallate; (iii) alkali halide; (iv) one or more source of Zn; and (v) one or more source of chalcogenide. The cell further comprises (c) a solid separator capable of transporting alkali metal ions between the first and second compartments; and (d) current collectors for the first and second compartments.

A yet further embodiment of the present invention is directed to an energy storage battery comprising a plurality of rechargeable energy storage cells in accordance with the above.

DETAILED DESCRIPTION

Figure 1:
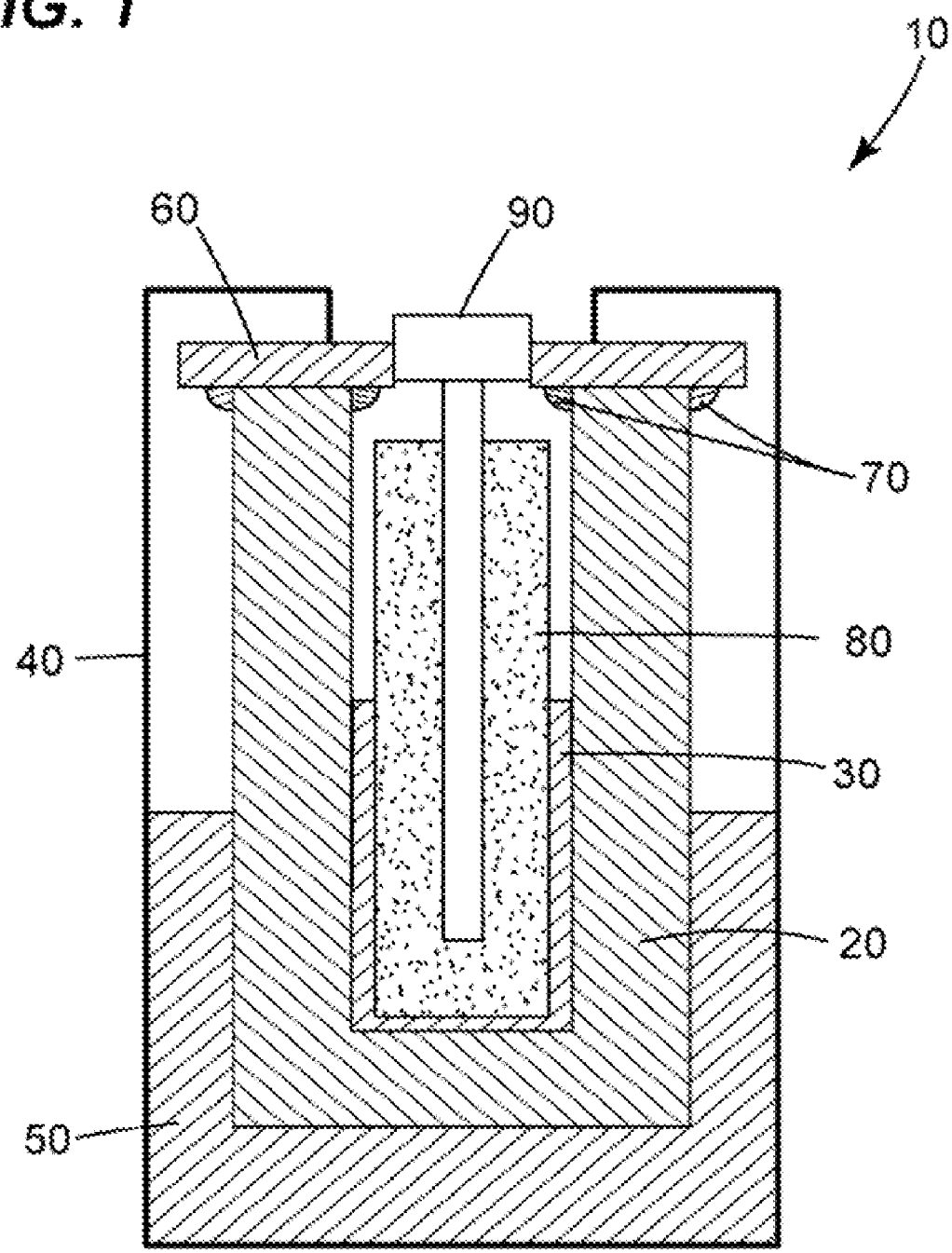
FIG. 1 is a schematic diagram depicting a cell in accordance with embodiments of this disclosure.

The invention includes embodiments that may relate to additive(s) for use in an energy storage device, an energy storage device including the additive(s), and an associated method. The additive(s) may be included in the cathode composition of the energy storage device, e.g., rechargeable energy storage cell. The additive(s) will be discussed in detail following disclosure of the additive environment, that is, the cathode composition and the like.

With regard to the cathode composition, these may include a transition metal and/or a transition metal halide. Suitable transition metals may include Ni, Fe, Cr, Mn, Co, V, and combinations thereof; or the like. In some embodiments, combinations of transition metals may be employed, such as nickel metal with iron metal, or such as nickel chloride with iron chloride. In some embodiments, the sole transition metal may be nickel. It may be noted that the oxidation state of the transition metal depends upon the charging status of the cathode composition when used as part of a rechargeable cell: when in a charged state, the transition metal may be predominantly in transition metal halide form; when in a discharged state, the transition metal may be predominantly in metallic form.

In certain embodiments, the transition metal component of the cathode composition, when in a discharged state, may be in the form of granules, pellets, beads or flakes or as a powder; generally, as particles. The powder may be a free-flowing powder. This transition metal component can have a high surface area; for example, if nickel powder is employed, one may utilize Ni having a surface area of about 0.6 m$^2$/g (BET), high surface area transition metal component by an in-situ production process; in one such embodiment, high surface area nickel may be produced in situ by using, as a precursor, NiO powder, which may be reduced prior to cathode manufacture.

An alkali halometallate may be a salt of alkali metal cation and a complex polyatomic anion which contains at least a halogen bonded to a metal that can form a complex anion with a halogen. Such complex anions may include anions such as $AlCl_4^-$, $ZnCl_3^-$, $ZnCl_4^{2-}$, $TiCl_6^{2-}$, $SnCl_3^-$, $SnCl_4^{2-}$, or $SnCl_6^{2-}$; or the like. Similar complex anions of metal, halogen, and oxygen or other element may be used as appropriate. These complexes may have a number of halogen atoms bonded to a primary metal in excess of the usual valence number of the metal. Alternatively, one or more such halogen can be replaced by oxygen or other atom. A suitable metal may include one or more selected from Al, Zn, and Sn; or the like. Use of Al as metal in the alkali halometallate may be employed in one embodiment of the invention.

In some embodiments, the alkali halometallate includes Li, Na, K, or a combination thereof. In some embodiments, the alkali halometallate includes at least one halogen selected from Cl, F, and Br. The cathode composition may further contain one or more free alkali metal halide including both a halogen and an alkali metal common to the alkali halometallate. For example, the electrolyte composition may include free solid NaCl in cases where $NaAlCl_4$ may be employed as an alkali halometallate.

Some suitable alkali halometallates include $NaCl:MCl_x$ complexes generally, such as $NaCl:AlCl_3$, $NaCl:ZnCl_2$, $NaCl:AlCl_3:ZnCl_2$, or combinations or mixtures of two or more thereof. The notation "$NaCl:MCl_x$" (where M may be one or more primary metal as previously defined above and x may be an integer of from at least 1 up to the oxidation state of M) may refer to a mixture and/or a complex salt including NaCl and $MCl_x$, in any mole ratio. In cases where the alkali halometallate salt includes $NaCl:AlCl_3$ to form a binary melt, the relative ratio of NaCl to $AlCl_3$ can be any mole ratio which may be effective to form a composition including molten $NaAlCl_4$ in the range of from about 100 degrees Celsius to 300 degrees Celsius. However, in some embodiments, the mole fraction used may be up to about 50 percent $AlCl_3$ in the $NaCl:AlCl_3$.

In accordance with at least some embodiments of the disclosure, the alkali halometallate may be in liquid or molten state when in use in electrochemical cells. Suitable melting points for alkali halometallates may be less than about 400 degrees Celsius or may be less than about 300 degrees Celsius. In one embodiment, the melting point may fall within the range of from about 100 degrees Celsius to about 300 degrees Celsius. When in the molten state, such alkali halometallate may exhibit the phenomenon of ionic conductivity.

A cathode composition of the present disclosure may not be wholly liquid or molten when in use or operation, but may include at least one alkali halometallate component that may be molten at such temperature. The cathode composition, in use, may be semi-solid. Cathode compositions according to embodiments of the disclosure may additionally include solids such as free NaCl or other free alkali metal halide salts, such as an alkali metal halide of at least one of Na and Li. Additionally, it may include other solids such as metallic transition metals and/or transition metal salts, as well as metallic main-group metals (e.g., Al). Often, the cathode composition may comprise at least one oxygen scavenger, typically metallic. In certain embodiments, such metallic oxygen scavenger may comprise metallic aluminum; an alloy of the transition metal (e.g., Ni, Fe, Cr, Mn, Co, V, and combinations thereof) and Al; or combinations thereof; or the like. When employed, the at least one metallic oxygen scavenger may be present in an amount of from about 0.1 wt % to about 0.9 wt % based on total mass of the cathode composition.

In general, cathode compositions in accordance with the present disclosure comprises source of Zn (e.g., at least one source of Zn) and source of chalcogenide (e.g., at least one source of chalcogenide). These may generally be referred to as "additives". As used herein, chalcogenide may refer to any of the elements of Group 16 of the Periodic Table of the Elements, except oxygen. Typically, chalcogenide refers to any one or more of the elements S, Se, Te, whether in elemental form, ionic form, or any other combined form.

In many embodiments, the source of Zn may selected from the group consisting of elemental Zn, Zn-sulfur compound, zinc selenide, Zn-halogen compound, alloy comprising Zn, and combinations and reaction products of any of the foregoing source of Zn; or the like. The term "Zn-sulfur" compound (or "Zn-halogen" compound) typically refers to a compound which contains at least Zn and S (or, at least Zn and one or more halogen, respectively). In other words, a Zn-halogen compound, for example, can contain other elements.

If the source of Zn is chosen to be a Zn-sulfur compound, it may be convenient to employ any one or more of the following: ZnS, sphalerite, $Zn_{1-x}Fe_xS$ where $0<x<1$, double salts of ZnS and $Na_2S$, and reaction products of any of the foregoing Zn-sulfur compound; or the like. Sphalerite is one of many naturally-occurring minerals which comprise a suitable Zn-sulfur compound. Examples of double salts of ZnS and $Na_2S$ include $Na_2ZnS_2$, $Na_2Zn_3S_4$, and $Na_6ZnS_4$; or the like. Many Zn-sulfur compounds in accordance with the present disclosure are simultaneously source of Zn and source of chalcogenide, and may be employed as such.

If the source of Zn is chosen to be a Zn-halogen compound, it may be convenient to employ any one or more of the following: $ZnCl_2$, $ZnBr_2$, $NaZnCl_3$, $Na_2ZnCl_4$, and reaction products comprising any of the foregoing Zn-halogen compound; or the like. Note that a source of Zn can simultaneously be a member of more than one group; for instance, a zinc bis(chlorosulfide) would be both a Zn-sulfur compound and a Zn-halogen compound. If the source of Zn is chosen to be an alloy comprising Zn, it may be convenient to employ any one or more of the following: $Na_2Zn$, zinc-copper alloy, zinc-aluminum alloy, zinc-copper-aluminum alloy, and reaction products of any of the foregoing alloy comprising Zn; or the like.

In general, cathode compositions in accordance with embodiments of the invention may comprise Zn in any effective amount. It may be beneficial for such cathode compositions to comprise Zn and chalcogenide in an amount effective to increase capacity and lower capacity degradation rate of rechargeable energy storage cells employing such cathode compositions, relative to absence of Zn and chalcogenide. Typically, the cathode composition may comprise Zn in an amount of from about 0.01 wt % to about 10 wt % (e.g., from about 0.2 wt % to about 3.5 wt %), based on total mass of the cathode composition. This is determined by mass of Zn (present in any form) as a percent of total cathode composition. In a narrower embodiment, the cathode composition may comprise Zn in an amount of from about 0.6 wt % to about 2.0 wt %, based on total mass of the cathode composition.

With respect to source of chalcogenide, as noted, chalcogenide typically may be S, Se or Te. Hence, the cathode composition may comprise one or more sources of sulfur, such as elemental sulfur, metal sulfide, sulfur-halogen compound, and combinations and reaction products of any of the foregoing source of sulfur; or the like. Where the source of sulfur is metal sulfide, it may be convenient to employ one or more of $Na_2S$, $Al_2S_3$, FeS, and reaction products of any of the foregoing metal sulfide; or the like. Alternatively, the source of chalcogenide may be one or more source of selenium, such as elemental selenium, metal selenide (e.g., ZnSe), selenium-halogen compound, and combinations and reaction products of any of the foregoing source of selenium. Note that ZnSe is simultaneously a source of Zn and source of chalcogenide, and may be employed as such in accordance with embodiments.

In general, cathode compositions in accordance with embodiments of the invention may comprise chalcogenide in any effective amount. Typically, the cathode composition may comprise chalcogenide in an amount of from about 0.01 wt % to 10 wt % (e.g., from about 0.1 wt % to about 3.5 wt %), based on total mass of the cathode composition. This is determined by mass of chalcogenide (present in any form) as a percent of total cathode composition. In a narrower embodiment, the cathode composition may comprise chalcogenide in an amount of from about 0.6 wt % to about 2.0 wt %, based on total mass of the cathode composition. In a particular embodiment, where the chalcogenide is chosen to be S, the cathode composition may comprise sulfur in an amount of from 0.2 wt % to about 1.5 wt %, based on total mass of the cathode composition.

In operation, the chemical components of a cathode composition comprising a source of Zn and a source of chalcogenide may be a complex mixture. For example, in operation, a cathode composition which initially includes an alkali halometallate (e.g., $NaAlCl_4$) and a source of Zn and a source of chalcogenide (e.g. ZnS as a source of both), may react at ambient temperature or when brought to a defined operating temperature (e.g., 300 degrees Celsius). Such reaction may, at least in part, form other species, such as species with sulfur-chlorine bonds, or complex sodium salts of zinc and sulfur, or oligomers or inorganic polymers. Alternatively, some or all of the initial source of Zn and initial source of chalcogenide may remain unreacted. Therefore, where the term "reaction product" is employed, it may be intended to encompass any decomposition products and/or products of reaction as may occur when a source of Zn and/or a source of chalcogenide are brought into contact with any other component of the cathode composition, e.g., the alkali halometallate.

Accordingly, the chemical form in which the additive exists while in operation within a cathode composition may be as a given named source of Zn and source of chalcogenide, and/or as a reaction product(s) of the foregoing. When a specific additive is named in this disclosure (e.g., ZnSe), that stoichiometric form is indicated, but can further embrace "reaction products" as aforementioned. Some of these reaction products may provide similar or even enhanced activity as does the initial form of the additive.

In combination with the source of Zn and source of chalcogenide, as previously discussed, the cathode composition may further include one or more secondary additives. In particular, the cathode composition may further comprise one or more secondary additive element comprising at least one of I, F, or Br. Typically, such secondary additive element is present as an alkali metal salt of at least one of I, F, or Br. In certain embodiments, the cathode composition may comprise such alkali metal salt of at least one of I, F, or Br in an amount of from about 0.1 wt % to about 1.5 wt % based on total mass of the cathode composition. Other forms of these and other secondary additives are contemplated as being within the scope of this disclosure. In one embodiment, the cathode composition may include other additives that may affect performance. Such performance additives may increase ionic conductivity, increase or decrease solubility of the charged cathodic species, improve wetting of the solid electrolyte by the molten electrolyte, or prevent ripening of the cathode microdomains, to name several utilities.

In accordance with embodiments of this disclosure, cathode compositions may be prepared by many methods, which may be constrained by such factors as economic considerations, processing concerns, yield issues, and/or performance issues in addition to considerations that pertain to the end-use and commensurate packaging. Each respective component of the cathode composition, depending on the processing stage, may be independently in a solid or a liquid state. For example, a solid form of the source of Zn and source of chalcogenide may be mixed with a solid form of the alkali halometallate. Alternatively, the source of Zn and source of chalcogenide may be mixed with a precursor to the alkali halometallate (e.g., NaCl) and the resulting admixture combined with a reaction-partner precursor to the alkali halometallate (e.g., $AlCl_3$). The combination may be reacted to form the alkali halometallate (e.g., $NaAlCl_4$) in situ.

In other embodiments of this disclosure, the cathode composition may be made by a method of combining an alkali halometallate with another substance which itself includes the source of Zn and source of chalcogenide. For example, the electrolyte composition may be made by combining a solid cathodic material with an alkali halometallate, where the solid cathodic material includes the source of Zn and source of chalcogenide. In such embodiments, the source of Zn and source of chalcogenide may exist initially in combination with a solid cathodic material, such as a transition metal and/or transition metal halide. Suitable transition metals may include at least one selected from the group consisting of Ni, Fe, Cr, Mn, Co, V; or the like. After combination of this solid cathodic material with an alkali halometallate, a composition including the subject source of Zn and source of chalcogenide may be thus provided. Cathode compositions in accordance with embodiments may be prepared in a single step, or more typically, in several steps.

One exemplary but non-limiting embodiment for assembling a cathode for electrochemical cells includes combining (e.g., mixing) source of Zn and source of chalcogenide with transition metal (e.g., Ni) in powdery metallic form and with alkali halide (e.g., NaCl) during the preparation of cathode granules. Granules having a longest dimension of from about 0.3 mm to about 1 mm are contemplated. After such granules are made, they may be suitably placed into a chamber for holding the cathode composition (e.g., a beta"-alumina tube equipped with a current collector) and filled with molten electrolyte (e.g., alkali halometallate such as $NaAlCl_4$), under vacuum. This is referred to as the impregnation process. Alternatively, one may also combine source of Zn and source of chalcogenide (which may be in solid form) with granules, after granule preparation. Both modes may be within the scope of the present disclosure. For examples, sources of Zn and sources of chalcogenide that do not readily hydrolyze under granulation conditions may be added during the granulation process. Sources of Zn and sources of chalcogenide that may suffer hydrolysis may be added to granules, after the latter are made. It may be also possible to mix sources of Zn and sources of chalcogenide with the molten electrolyte, and later combine this with the granules to form the cathode mixture. In all of these possible methods, it may be desirable (although not always required) to ensure a good distribution within the granules. In some cases, a pore-former such as ammonium bicarbonate can be added to granules containing transition metal so as to increase porosity of these granules.

In one embodiment, the cathode composition may be disposed on an electronically conductive support structure. The support structure may be a foam, a mesh, a weave, a felt, or a plurality of packed particles, fibers, or whiskers. In one embodiment, a suitable support structure may be formed from carbon. A suitable carbon form may be reticulated foam. A support structure may also be formed from a metal, ceramic, or cermet material.

As noted, another embodiment of the present invention is directed to a rechargeable energy storage cell comprising, (a) a first compartment comprising metallic alkali metal; (b) a second compartment comprising a cathode composition; (c) a solid separator capable of transporting alkali metal ions between the first and second compartments; and (d) current collectors for the first and second compartments. The cathode composition may be any of those noted above. The first compartment will be referred to as the "anode" or the "anode compartment", and the second compartment will be referred to as the "cathode" or the "cathode compartment". This reflects the function of each compartment during discharge of the cell. Cathode compositions in accordance with the disclosure may be retained in a compartment or container. The compartment may, for example, form an integral part of an electrochemical cell (for example, a chamber) or be suitable for assembly within an electrochemical cell. The compartment or container may also function as a separator (i.e., physically separates and electrically isolates an anode from the cathode composition in an electrochemical cell). For example, the compartment or container can have a wall at least partially including a solid ion-conducting electrolyte material, such as beta alumina or beta"-alumina.

In accordance with embodiments of the invention, a solid separator may be employed which is capable of transporting alkali metal ions between the first and second compartments. The separator (e.g., the solid electrolyte material forming a wall of the compartment for the cathode composition), will be composed of a ceramic material, although the possibility exists that it may include ion-conducting glass or polymeric material, and combinations of these materials.

In practice, the solid electrolyte material may be a conductor of sodium ions, being e.g. made of beta-alumina, nasicon or beta"-alumina. (Nasicon generally refers to $Na_3Zr_2Si_2PO_{12}$). If it is required that the solid electrolyte be a conductor of ions other than those of sodium, other materials may be used, such as analogues of beta- or beta"-alumina that are capable of conducting other metallic ions such as the ions of other alkali metals.

Suitable separators may sometimes include a composite of alumina and a metal (ceramic) oxide. The alumina may be beta alumina, beta"-alumina, or their mixture, characterized by a fast conductivity for sodium ions. Beta-alumina has a composition range defined by $Na_2O$—$Al_2O_3$ phase diagram, although other species may be present. Beta-alumina has hexagonal crystal structure and contains about 1 mole of $Na_2O$ to about 9 moles of $Al_2O_3$. Beta"-alumina has a higher ratio of about 1 moles of $Na_2O$ to about 5 mole of $Al_2O_3$ and ordinarily has rhombohedral structure. Solid separators composed of beta"-alumina are often referred to as BASE (i.e., beta"-alumina solid electrolyte). In one embodiment, a portion of the separator may be alpha alumina and another portion of the separator may be beta-alumina. The alpha alumina may be relatively more amenable to bonding (e.g., compression bonding) than beta-alumina, and may help with sealing and/or fabrication of the cell.

Other separator materials may include an alkali-metal-beta'-gallate, an alkali-metal-beta"-gallate, or a combination of two or more of the foregoing. Further separator materials may include molecular sieves, as illustrated by tectosilicates, e.g. a felspar, felspethoid and zeolites. Synthetic zeolites such as ZSM-5 and the like may be employed as the separator in the devices and device components provided by the present invention. In one embodiment, the separator comprises a rare-earth silicophosphate. In another embodiment, the separator comprises a silicon nitride ceramic.

The separator can be stabilized by the addition of small amounts of materials including, but not limited to lithia, magnesia, zinc oxide, yttria or similar oxides. These stabilizers may be used alone or in combination with themselves or with other materials. The solid separator may include one or more dopant. Suitable dopants may include oxide of a transition metal selected from iron, nickel, copper, chromium, manganese, cobalt or molybdenum. Sodium ion conductivity of one form of beta"-alumina separator electrolyte at 300 degrees Celsius may be in a range of from about 0.2 ohm$^{-1}$ cm$^{-1}$ to about 0.4 ohm$^{-1}$ cm$^{-1}$. The separator may also be a ceramic composite of an oxygen-ion conductor and one or both of beta- or beta"-alumina. In one embodiment, the separator may be a composite of beta"-alumina and zirconia. Zirconia has good strength properties and good chemical stability. Thus, the resulting separator may be relatively mechanically stronger, more durable, and more reliable. Due to the associated chemically stable and strength, the composite separator may improve the reliability of the electrochemical cell and may allow the use of a thinner walled separator having less ionic resistance while maintaining a suitable electrical resistance. A thinner wall of the composite separator may provide relatively more strength while maintaining a suitably high ionic conductivity.

In cells according to embodiments of the disclosure, the solid separator may include a shape which may be flat, undulate, domed or dimpled, or includes a shape with a cross-sectional profile that may be an ellipse, triangle, cross, star, circle, cloverleaf, rectangular, square, or multi-lobal; or the like. These shapes may increase the surface of the solid separator/electrolyte and enhance accessibility to the cathode composition and the anode, resulting in higher cell power.

In one embodiment, the rechargeable energy storage cell includes a first (or anode) compartment containing a metallic alkali metal, such as sodium, that can function as an anodic material. Other suitable anodic material may include one or both of lithium and potassium, and which may be used alternatively or additively with sodium. The anodic material may be molten during use. The cell may also include, or be in communication with, a reservoir of anodic material. The anodic material may also include a metal oxygen scavenger. Suitable metal oxygen scavengers may include one or more of manganese, vanadium, zirconium, aluminum, or titanium. Other useful anodic additives (i.e., materials added to the anode, as opposed to added to the cathode composition) may include materials that increase wetting of the separator surface by the molten anodic material. Additionally, some anodic additives may enhance the contact or wetting of the separator with regard to a current collector, to ensure substantially uniform current flow throughout the separator.

It may be contemplated that cells of the present disclosure will be initially assembled in a discharged state, so that metallic alkali metal does not have to be handled. The reversible cell reaction applicable to cells of the present disclosure is

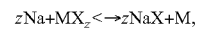

where M may be a any of the named transition metals (e.g., a divalent transition metal such as Ni and/or Fe), z is the valence of transition metal M (often having a value of 2 or 3), and X may be a halide, which may be chloride. Discharging occurs left to right, and charging right to left. Thus, a compartment may initially contain a composition of an alkali metal, such as NaCl, which may be converted into metallic sodium upon charging of the cell.

A suitable cell may include current collectors for each of the first and second compartments. The cell may have a plurality of current collectors including anode current collectors and cathode current collectors, where the current collectors have electrical contact with the anode and cathode materials. Suitable materials for the anode current collector may include W, Ti, Ni, Cu, Mo, carbon or combinations thereof. Other suitable materials for the anode current collector may include steel or stainless steel. The cathode current collector may vary in shape. The cathode current collector may be a rod, wire, paddle or mesh or combination. It may be formed from Pt, Pd, Mo, W, Au, Ni, Cu, C, or Ti, among others. In one embodiment, either or both of the current collectors is plated. In an alternate embodiment, either or both of the current collectors is clad.

When in use or operation, suitable operating temperatures of electrochemical cells in accordance with embodiments may include, for example, temperatures of from about 200 degrees Celsius to about 500 degrees Celsius, or from about 250 degrees Celsius to about 335 degrees Celsius, or from about 335 degrees Celsius to about 400 degrees Celsius.

FIG. 1 is a schematic diagram depicting an exemplary embodiment of a sodium-metal halide battery cell 10. The cell 10 has a sodium-ion conductive beta-alumina electrolyte tube 20, a cathode compartment 30, a cell case 40 capable of containing elemental sodium 50 arranged at the outside of the electrolyte tube 20, a current collector 90 in electrical contact with the contents 80 of cathode compartment 30, and an electrically insulative alpha-alumina ceramic collar 60. The cathode compartment 30, which may contain any of the cathode compositions described herein as its contents 80, may be arranged at the inside of the electrolyte tube 20. The ceramic collar 60 joins the upper end of the electrolyte tube 20 by means of a seal structure 70, formed from a sealing glass.

A single cell has been described herein, it being understood that a plurality of such cells may be connected in series, as well as in parallel, to provide the required voltage and battery capacity for any specific use. Exemplary uses may include a vehicle, such as an electric car or locomotive, or in an electrical grid applications, such as for load leveling in electrical utilities, or the like. It may be contemplated to be within the scope of this disclosure to include an energy storage battery including a plurality of rechargeable energy storage cells in accordance with the description set forth above. For convenience, a group of coupled cells may be referred to as a module or pack. The ratings for the power and energy of the module may depend on such factors as the number of cells in the module. Other factors may be based on end-use application specific criteria.

In one embodiment, a controller communicates with the plurality of the cells. The controller can distribute an electrical load to select cells in a cell module in response to feedback signals indicating states for each of the cells in the cell module. The controller can perform a re-warm method in which a series of heating elements are activated in a sequence to melt a frozen portion of the energy storage device in a determined manner. In another embodiment, the controller may distribute an electrical load to select cathodic materials at determined locations within individual cells.

If present, a heat management device maintains the temperature of the energy storage system. The heat management device can warm the energy storage system if too cold, and can cool the energy storage system if too hot to prevent an accelerated cell degradation. The heat management system includes a thaw profile that can maintain a minimal heat level in the anode and cathode chambers to avoid a freeze of cell reagents. Another embodiment of the invention provides an energy management system that includes a second energy storage device that differs from the energy storage device. This duel energy storage device system can address the ratio of power to energy in that a first energy storage device can be optimized for efficient energy storage, and a second energy storage device can be optimized for power delivery. The control system can draw from either energy storage device as needed, and charge back either energy storage device that needs such a charge.

EXAMPLES

Examples are provided for illustrative purposes and do not limit the scope of the claimed invention. The materials presented are commercially available from such common chemical suppliers as Sigma Aldrich, Inc. unless otherwise specified.

General Cell Assembly Protocol

A general, non-limiting method for assembly of an electrochemical cell is as follows. Cathode materials, including nickel powder, microfine sodium chloride, aluminum powder and optionally additives were cold pressed under 110-115 bar linear pressure using Alexanderwerk WP50N/75 Roll Compactor/Milling Machine. The pressurized material was ground under a rotating mill into granules, and the fraction having size between 0.325 mm to 1.5 mm was used for the cell. In some cases, additives were mixed with the granules. In this exemplary embodiment, the following materials were used: metal nickel 255 (Inco Special Products, 97.9% pure, 0.6 $m^2/g$, 2.2-2.8 mm particle size); sodium chloride NaCl (Custom Powders LTD, UK, 99.99% purity, heat treated at 220° C. under vacuum, and milled to avg. particle size 90%<75 um); aluminum powder (Alfa Aesar Item #42919, −100+325 mesh, 99.97%); zinc sulfide ZnS (Sigma Aldrich, 99.9%); iron sulfide FeS (Sigma Aldrich, 99.9%); sodium fluoride NaF (Sigma Aldrich, >99%); and sodium iodide NaI (Sigma Aldrich, 99.999%). To prepare sodium tetrachloroaluminate ($NaAlCl_4$), 500 g of aluminum chloride (Sigma-Aldrich, 99.99%) additionally purified via sublimation was mixed with sodium chloride (Sigma-Aldrich, 99.999%) in appropriate molar ratio and heated to 300° C.

Electrochemical cells have been assembled using the hardware described in the paper, Sudworth, J. L., "The Sodium/Nickel Chloride (ZEBRA) Battery", *Journal of Power Sources* 2001, 100, (1-2), 149-163. Solid cathode materials as granules or mixture of granules with additives (prepared as above), were placed in the cloverleaf shaped beta"-alumina tube, which was preassembled with the anode chamber and the cathode current collector, and densified by vibration on a vibratory shaker in a nitrogen filled glove box. The cathode compartment was then filled with molten sodium tetrachloroaluminate NaAlCl4 under vacuum at 280° C. The cell was welded at 230° C. inside the glove box using a MaxStar Miller Welder, with UHP Argon Purge, and tested for leaks.

Cell Test Protocols

All cells have been assembled in the discharged state. Two different testing protocols were used.

In Protocol A, in the break-in (so-called "maiden") charge the cell was charged with ~1 Ah to 2.67 V, and then at constant voltage (CV) until current I is less than 0.5 A. Before testing the cell at high current, ten conditioning cycles were performed: −16 A discharge until the mean cell voltage less than 1.8V or until 32 Ah discharged, 10 min rest, then charge 10 A to 2.67 V/cell, then constant voltage charge until I<0.5 A. Finally cells were discharged to 32 Ah at a −16 A rate. The cell degradation testing was done at 32 A charge to 22 Ah or 3.05 V, and then constant voltage until 22 Ah charged, −32 A discharge to 22 Ah or to 1.8 V, and then CV until 22 Ah discharged. After each 20 cycles, one characterization cycle (10 A charge to 2.67 V/cell, CV until I<0.5 A, −16 A discharge to 32 Ah) was done.

In Protocol B, the break-in (maiden) charge was done at 330° C. according the following sequence: 80 mA current for 2 hrs, 400 mA for 2 hrs, 800 mA for 2 hrs, 2.75 A for 8 hrs, 5.5 A till 2.67 V limit, then constant voltage charge till the current limit 0.5 A. The cell testing was done at 300° C. Then cells were conditioned according Table 1 and then tested at 48 A discharge and charge current. After each 20th cycle, the conditioning cycle at 16 A charge and discharge current to the current limit 0.5 A was performed.

TABLE 1

Parameters of Test Protocol B.

| Cycle# | Discharge | Charge |
|---|---|---|
| 1 | −16 A to 1.8 V | 10 A to 2.67 V, CV to I < 0.5 A |
| 2 | −32 A to 1.8 V | 10 A to 2.67 V, CV to I < 0.5 A |
| 3 | −48 A to 1.8 V | 10 A to 2.67 V, CV to I < 0.5 A |
| 4 | −16 A to 1.8 V | 32 A to 3.4 V, CV to I < 16 A |
| 5 | −16 A to 1.8 V | 48 A to 3.4 V, CV to I < 16 A |
| 20x | −48 A to 1.8 V, CV until I > −16 A | 48 A to 3.4 V, CV to I < 16 A |
| 1x | −32 A to 1.8 V | 10 A to 2.67 V, CV to I < 0.5 A |

Example 1 and Control Example 1

Figure 2:
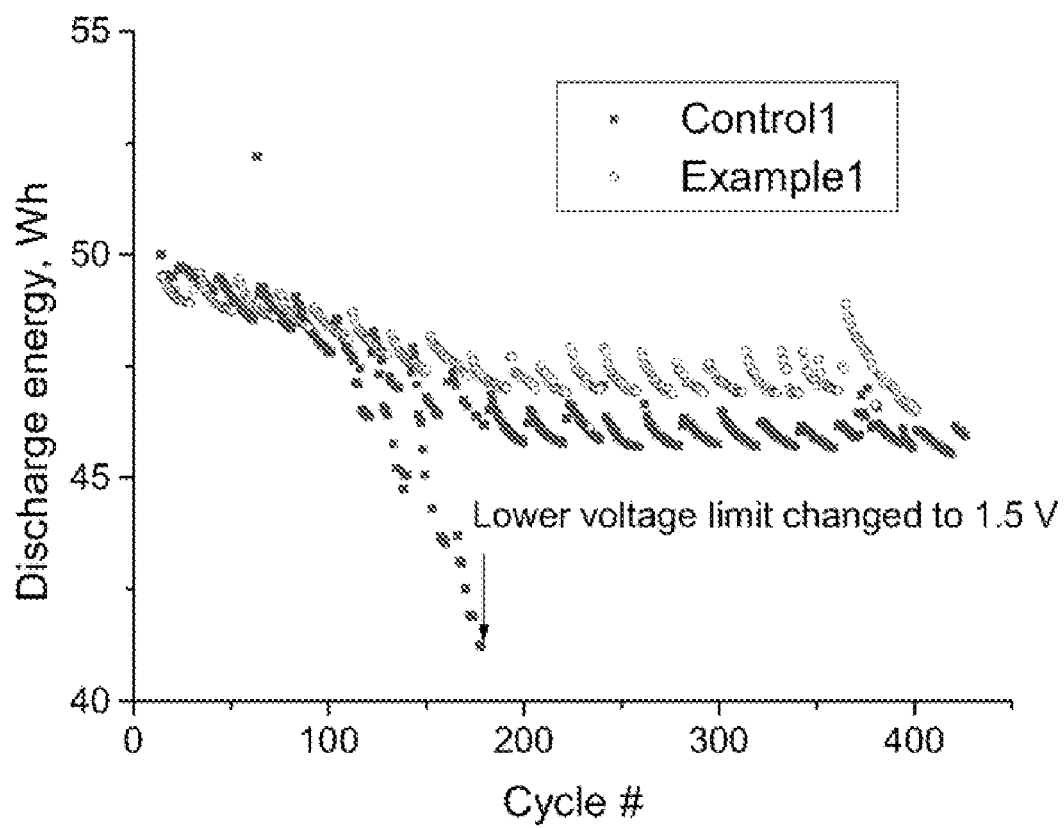
FIG. 2 is graphical data of the constant-charge cycling of cells with cathodes in accordance with examples described herein.
Figure 3:
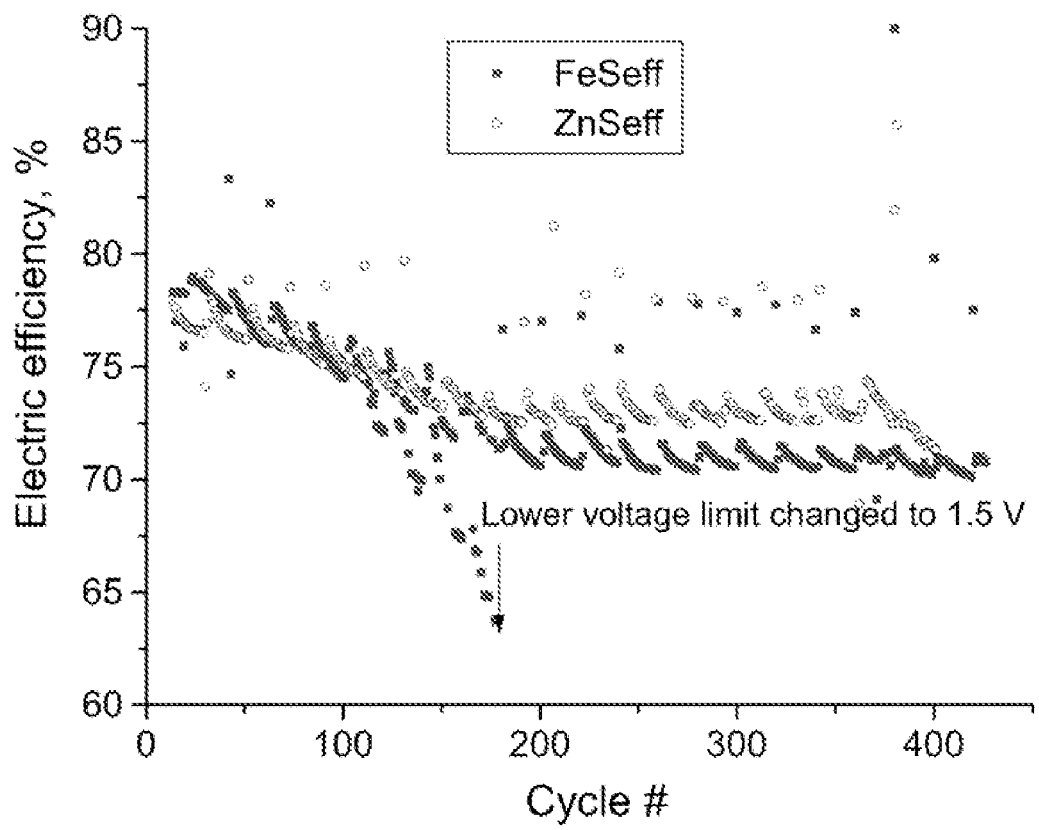
FIG. 3 is graphical data of electric efficiency of cells with cathodes in accordance with examples described herein.

Ten cells with similar nickel-sodium chloride cathodes and containing substantially the same amount of sulfur (namely, zinc sulfide ZnS for Examples 1 and 2, and iron monosulfide FeS for Control Example 1 and Control Example 2) were assembled and tested according to Protocol A. The cathode compositions are given in Table 2 and the cell testing results (average of 10 cells) in FIG. 2 and FIG. 3. Control cells showed fast degradation as seen from FIG. 2. In general FIG. 2 depicts the constant-charge cycling of cells with cathodes containing ZnS (Example 1) as compared to FeS (Control Example 1), for an average of ten cells. Note that in order to keep the constant charge 22 Ah, at some point the lower voltage limit was reduced to 1.5 V for the control cells but kept the initial 1.8 V for the cells containing ZnS. Note that FIG. 3 shows the electric efficiency of cells with cathodes containing ZnS (Example 1, $ZnS_{eff}$) and FeS (Control Example 1, $FeS_{eff}$), for an average of ten cells.

TABLE 2

Cathode composition of control and exemplary cells.

| | Control Example 1 | Example 1 | Control Example 2 | Example 2 |
|---|---|---|---|---|
| Ni, g | 140.0 | 136.2 | 136.1 | 134.9 |
| NaCl, g | 103.0 | 100.2 | 107.5 | 106.0 |
| Al, g | 2.00 | 1.95 | 1.95 | 1.94 |
| NaF, g | 5.00 | 4.86 | — | — |
| NaI, g | 1.00 | 0.97 | 0.99 | 2.00 |
| FeS, g | 4.00 | — | 3.91 | — |
| ZnS, g | — | 3.89 | — | 3.66 |
| Total solids, g | 255.0 | 248.0 | 250.4 | 248.5 |
| NaAlCl$_4$, g | 115.0 | 115.0 | 125.0 | 125.0 |
| Test protocol | A | A | B | B |

Example 2 and Control Example 2

Figure 4:
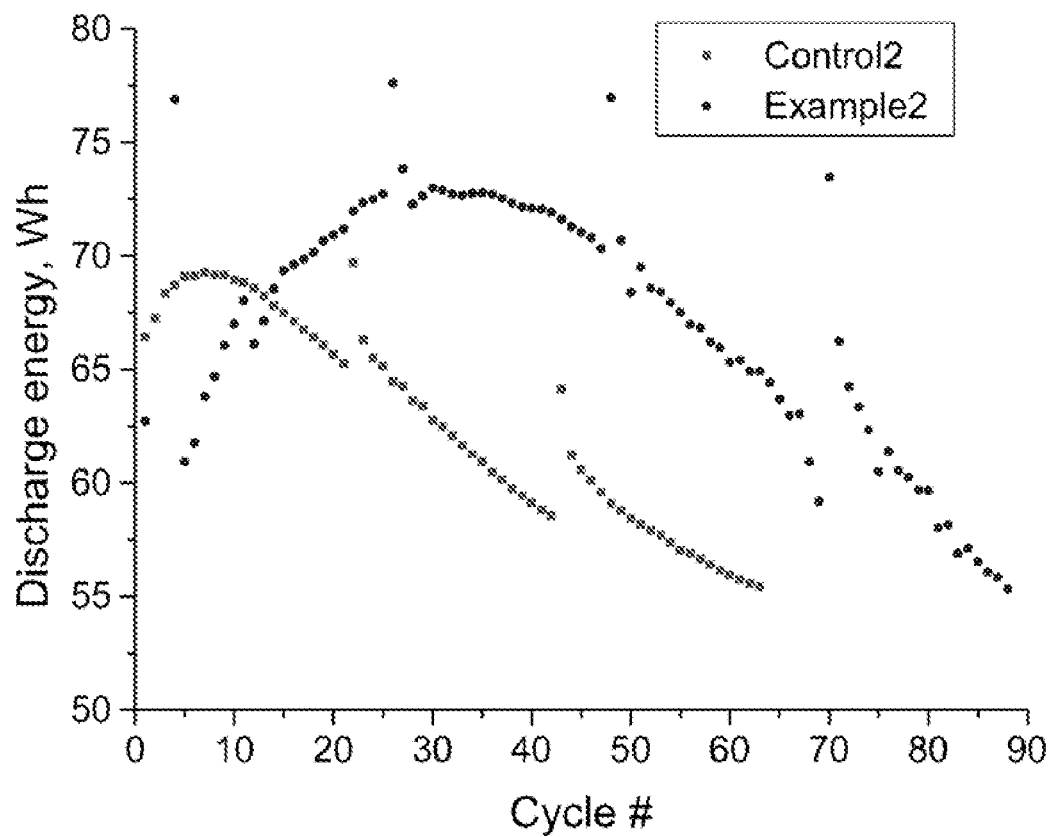
FIG. 4 is graphical data of high current deep cycling of cells in accordance with examples described herein.

Cells with similar nickel-sodium chloride cathodes containing iron disulfide ZnS (Example 2) and iron monosulfide FeS (Control Example 2), with about the same amount of total sulfur, have been assembled and tested according to Protocol B. The cathode compositions are given in Table 2 and the cell testing results in FIG. 4. The cell with the ZnS containing cathode showed much higher discharge energy and about the same degradation rate compared with the cell containing sulfur in the form of FeS. FIG. 4 depicts a high current (48 A) deep cycling of cells, with cathodes containing ZnS (Example 2) and FeS (Control Example 2).

Examples 3-9

Figure 5:
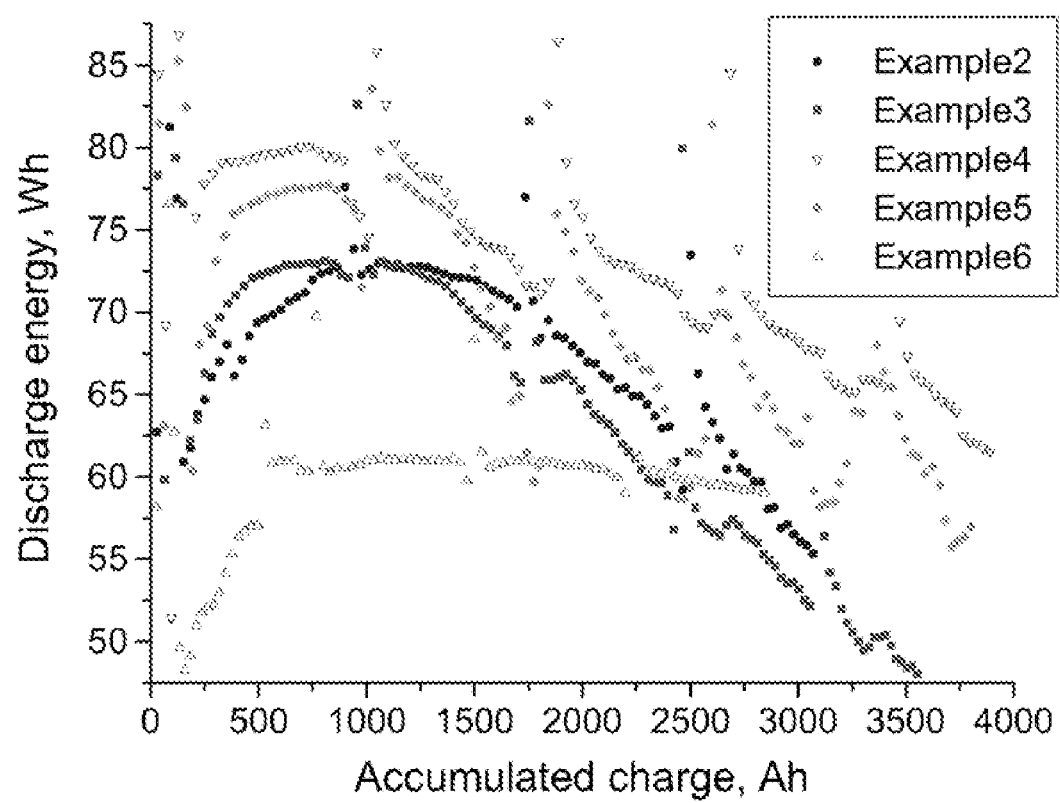
FIG. 5 is graphical data plotting discharge energy vs. accumulated charge at high current deep cycling of cells, in accordance with examples described herein.

To demonstrate the effect of ZnS concentration, and the presence of optional NaF and NaI additives, electrochemical cells with cathodes containing different amounts of these additives were built and tested according to Protocol B. The cathode compositions are given in Table 3, and the cell testing results in Table 4 and FIG. 5. The increase of the amount of ZnS in the presence of NaF and NaI additives increases the cell capacity and discharge energy and decreases the degradation rate. The use of ZnS alone provides less cell capacity but significantly improves the degradation rate (Example 6). FIG. 5 depicts a plot of discharge energy vs. accumulated charge at high current (48 A) deep cycling of cells, with cathodes containing different amounts of ZnS, NaI and NaF (Examples 3-6).

TABLE 3

Cathode composition of cells containing ZnS and optional NaI and NaF additives.

| Cathode composition | Example 3 | Example 4 | Example 5 | Example 6 |
|---|---|---|---|---|
| Ni, g | 131.5 | 130.1 | 125.1 | 132.0 |
| NaCl, g | 108.0 | 108.0 | 108.0 | 108.0 |
| Al, g | 1.8 | 1.9 | 1.9 | 1.9 |
| NaF, g | 5.0 | 3.75 | 5.0 | — |
| NaI, g | 2.0 | 1.5 | 2.0 | — |
| ZnS, g | 2.0 | 5.25 | 8.5 | 8.5 |
| Total solids, g | 250.0 | 250.0 | 250.0 | 250.0 |
| NaAlCl$_4$, g | 125.0 | 125.0 | 125.0 | 125.0 |

TABLE 4

Performance (test protocol B) of cells containing ZnS and optional NaI and NaF additives.

| Cell performance | Example 2 | Example 3 | Example 4 | Example 5 | Example 6 |
|---|---|---|---|---|---|
| Maximum cycling capacity, Ah | 37.8 | 39.6 | 41.6 | 41.4 | 34.5 |
| Cathode utilization, % | 87.3 | 85.2 | 87.6 | 82.0 | 74.2 |
| Degradation rate, Wh/cycle | 0.35 | 0.31 | 0.19 | 0.22 | 0.05 |

Examples 10 and 11

Figure 6:
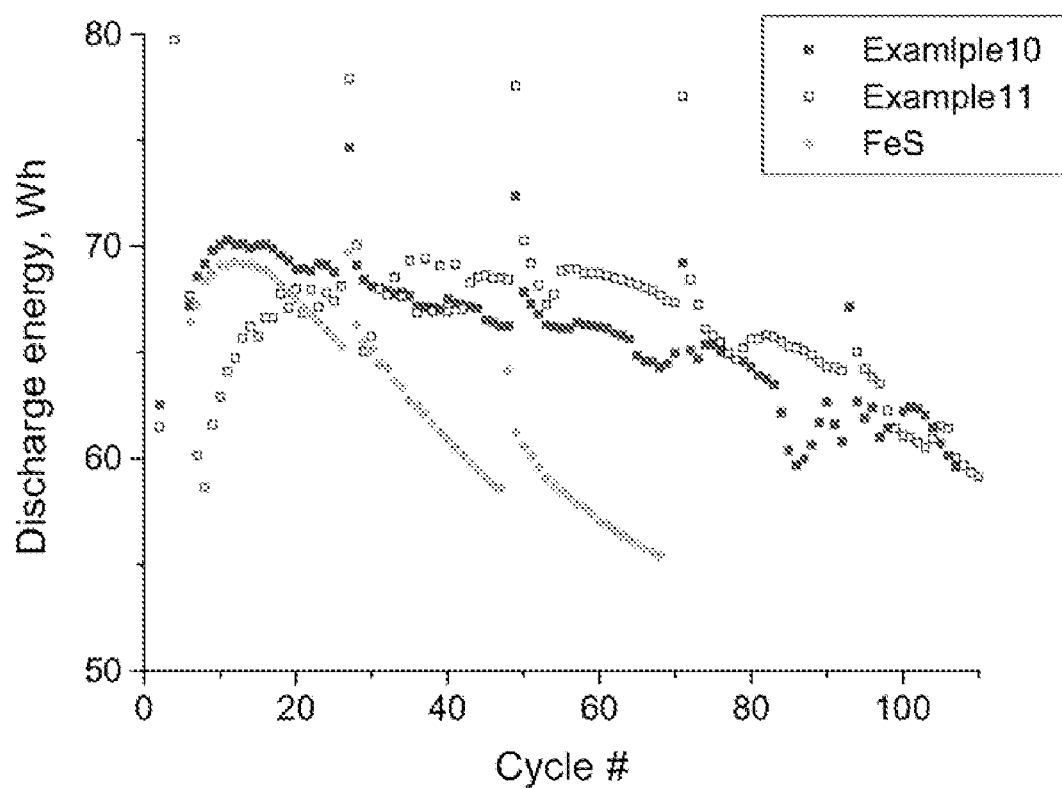
FIG. 6 is graphical data of high current deep cycling of cells in accordance with examples described herein.

Cells with similar nickel-sodium chloride cathodes but containing zinc selenide ZnSe as additive were assembled. These are denoted Examples 10 and 11. These cells had about the same amount of total zinc chalcogenide as for cells with ZnS in the prior examples. The ZnSe-containing cells were assembled and tested according to Protocol B. The cathode compositions are given in Table 5 and the cell testing results in FIG. 6. The cell with the ZnSe containing cathode showed much higher discharge energy and better degradation rate compared with the cell containing sulfur in the form of FeS (Control Example 2). FIG. 6 depicts high current (48 A) deep cycling of cells, with cathodes containing ZnSe (Examples 10 and 11) and FeS (Control Example 2).

TABLE 5

Cathode composition of cells containing
ZnSe and optional NaI and NaF additives

| Cathode composition | Example 10 | Example 11 |
|---|---|---|
| Ni, g | 132.7 | 129.9 |
| NaCl, g | 108.0 | 108.0 |
| Al, g | 1.8 | 1.9 |
| NaF, g | — | 3.75 |
| NaI, g | — | 1.5 |
| ZnSe, g | 7.8 | 5.4 |
| Total solids, g | 250.0 | 250.0 |
| NaAlCl$_4$, g | 125.0 | 125.0 |

The embodiments of the present disclosure may improve the extractable capacity of cells, and decrease the cell resistance. Therefore, a cell comprising cathode compositions according to the present disclosure may exhibit better tolerance toward high currents and longer cycle life. Along with better energy efficiency that may improve the fuel savings when batteries comprising such cells are being used in hybrid vehicles such as locomotives and cars. However, the rechargeable energy storage cell may also be used aboard a space vehicle, or in an electric locomotive, tug boat, mine vehicle, heavy duty truck, uninterrupted power supply unit, telecommunication unit, intermittent solar energy production unit, and/or intermittent wind energy production unit.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity may be inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable.

The foregoing examples are merely illustrative of some of the features of the invention. The appended clauses are intended to define the invention as broadly as it has been conceived and the examples herein presented are illustrative of selected embodiments from a manifold of all possible embodiments. Accordingly it is Applicants' intention that the appended clauses are not to be limited in definition by the choice of examples utilized to illustrate features of the present invention. As used in the clauses, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art, and those variations should be construed to be covered in the appended clauses. It is also anticipated that advances in science and technology will make equivalents and substitutions possible that are not now contemplated by reason of the imprecision of language and these variations should also be construed where possible to be covered by the appended clauses.

The invention claimed is:

1. A cathode composition, comprising:
   (i) particles comprising a transition metal selected from the group consisting of Ni, Fe, Cr, Mn, Co, V, and combinations thereof;
   (ii) alkali halometallate;
   (iii) alkali halide;
   (iv) source of Zn; and
   (v) source of chalcogenide;
   wherein the cathode composition comprises chalcogenide in an amount of from about 0.01 wt % to 10 wt % and wherein the cathode composition comprises Zn in an amount of from about 0.01 wt % to about 10 wt %.

2. The cathode composition according to claim 1, wherein the transition metal comprises Ni.

3. The cathode composition according to claim 1, wherein the alkali metal halide comprises at least one of Na and Li.

4. The cathode composition according to claim 1, further comprising at least one halide of the transition metal.

5. The cathode composition according to claim 1, wherein the alkali halometallate has a melting point of less than about 300° C.

6. The cathode composition according to claim 1, wherein the alkali halometallate is a halometallate of a metal selected from at least one of Al and Sn.

7. The cathode composition according to claim 6, wherein the alkali halometallate comprises NaAlCl$_4$.

8. The cathode composition according to claim 1, wherein the chalcogenide is selected from at least one of Te and Se.

9. The cathode composition according to claim 1, wherein the composition further comprises one or more secondary additive element comprising at least one of I, F, or Br.

10. The cathode composition according to claim 1, wherein the source of Zn is selected from the group consisting of elemental Zn, Zn-sulfur compound, zinc selenide, Zn-halogen compound, alloy comprising Zn, and combinations and reaction products of any of the foregoing source of Zn.

11. The cathode composition according to claim 10, wherein the source of Zn is Zn-sulfur compound selected from one or more of ZnS, sphalerite, $Zn_{1-x}Fe_xS$ where $0<x<1$, double salts of ZnS and $Na_2S$, and reaction products of any of the foregoing Zn-sulfur compound.

12. The cathode composition according to claim 1, wherein the chalcogenide is sulfur.

13. The cathode composition according to claim 12, wherein the source of sulfur is selected from the group consisting of elemental sulfur, metal sulfide, sulfur-halogen compound, and combinations and reaction products of any of the foregoing source of sulfur.

14. The cathode composition according to claim 1, wherein the composition comprises Zn in an amount of from about 0.2 wt % to about 3.5 wt % based on total mass of the cathode composition.

15. The cathode composition according to claim 1, wherein the composition comprises chalcogenide in an amount of from about 0.1 wt % to about 3.5 wt % based on total mass of the cathode composition.

16. A rechargeable energy storage cell, comprising:
   (a) a first compartment comprising metallic alkali metal;
   (b) a second compartment comprising a cathode composition, the cathode composition including:

(i) particles comprising a transition metal selected from the group consisting of Ni, Fe, Cr, Mn, Co, V, and combinations thereof;
(ii) alkali halometallate;
(iii) alkali halide;
(iv) source of Zn; and
(v) source of chalcogenide;
wherein the cathode composition comprises chalcogenide in an amount of from about 0.01 wt % to 10 wt % and wherein the cathode composition comprises Zn in an amount of from about 0.01 wt % to about 10 wt %:
(c) a solid separator capable of transporting alkali metal ions between the first and second compartments; and
(d) current collectors for the first and second compartments.

17. The rechargeable energy storage cell according to claim 16, wherein each of the source of Zn and the source of chalcogenide is present in an amount effected to increase capacity and lower capacity degradation rate of said cell, relative to absence of the source of Zn and the source of chalcogenide.

18. The rechargeable energy storage cell according to claim 16, wherein the metallic alkali metal is molten under operating conditions of the cell.

19. The rechargeable energy storage cell according to claim 16, wherein the solid separator comprises a beta-alumina, a beta"-alumina, nasicon, a gamma-alumina, a molecular sieve, silicon nitride, or silicophosphate.

20. An energy storage battery comprising a plurality of rechargeable energy storage cells, each cell in accordance with claim 16.

21. A cathode composition, comprising:
(i) particles comprising a transition metal wherein the sole transition metal is nickel;
(ii) alkali halometallate;
(iii) alkali halide;
(iv) source of Zn; and
(v) source of chalcogenide;
wherein the cathode composition comprises chalcogenide in an amount of from about 0.01 wt % to 10 wt % and wherein the cathode composition comprises Zn in an amount of from about 0.01 wt % in about 10 wt %.

22. A rechargeable energy storage cell, comprising:
(a) a first compartment comprising metallic metal;
(b) a second compartment comprising the cathode composition of claim 21;
(c) a solid separator capable of transporting alkali metal ions between the first and second compartments; and
(d) current collectors for the first and second compartments.

23. An energy storage battery comprising a plurality of rechargeable energy storage cells, each cell in accordance with claim 22.

* * * * *